UNITED STATES PATENT OFFICE.

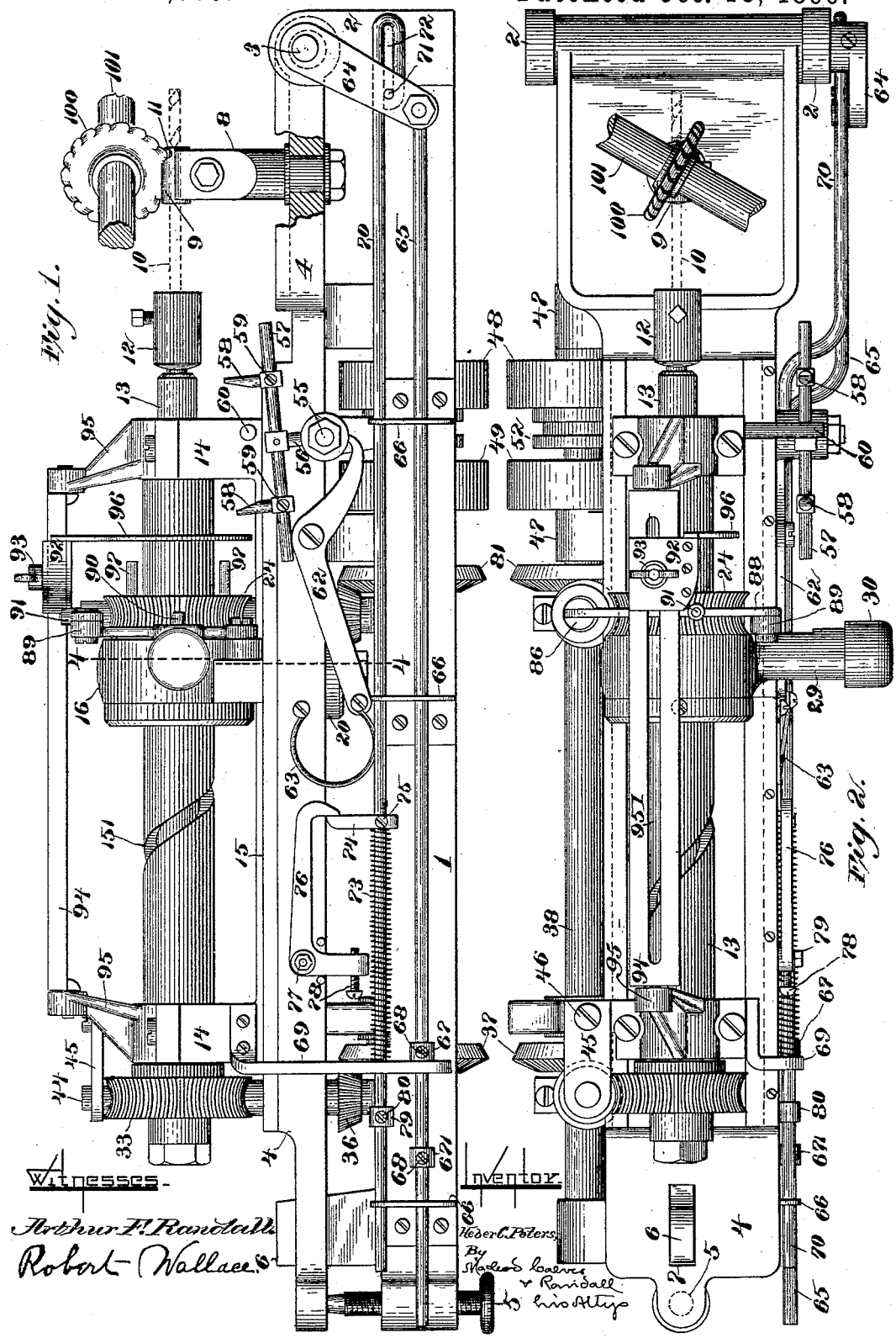

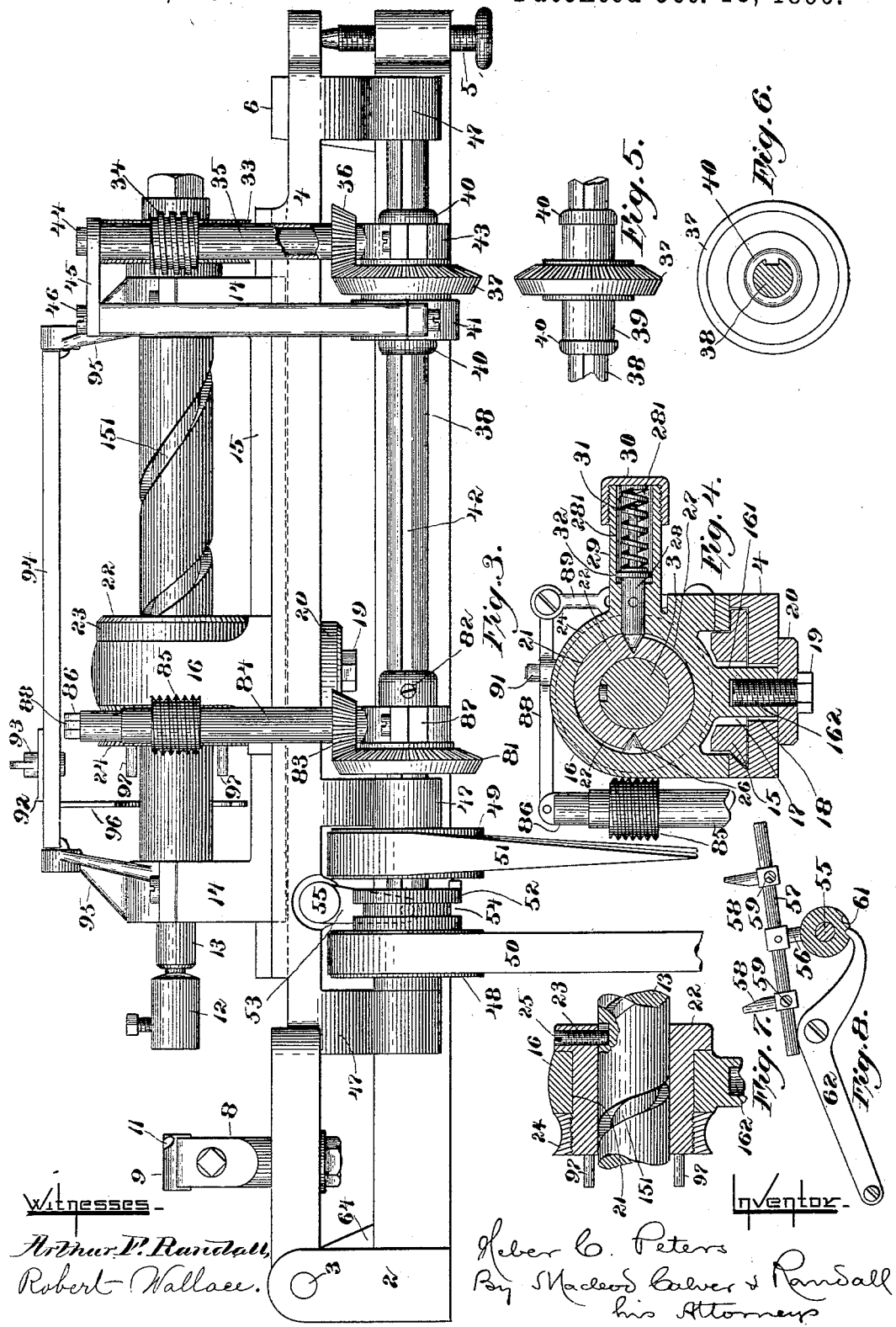

HEBER C. PETERS, OF BOSTON, MASSACHUSETTS, ASSIGNOR OF ONE-HALF TO JAMES H. REED, OF SAME PLACE.

MACHINE FOR CUTTING TWIST-DRILLS, &c.

SPECIFICATION forming part of Letters Patent No. 569,565, dated October 13, 1896.

Application filed September 4, 1894. Serial No. 521,995. (No model.)

*To all whom it may concern:*

Be it known that I, HEBER C. PETERS, a citizen of the United States, residing at Boston, in the county of Suffolk and State of Massachusetts, have invented certain new and useful Improvements in Machines for Cutting Twist-Drills and the Like, of which the following is a specification, reference being had therein to the accompanying drawings.

Figure 1 of the drawings is a view showing in side elevation a machine containing the best embodiment of my invention which has yet been devised by me. Fig. 2 is a view showing in plan the machine that is represented in Fig. 1. Fig. 3 is a view of the said machine in side elevation, the view being taken from the side of the machine which is opposite to that represented in Fig. 1 and the cutter and its shaft being omitted. Fig. 4 is a section on the irregular line 4 4, Fig. 1. Fig. 5 is a detail of the sliding gear 37 and its collar, as well as a portion of the driving-shaft. Fig. 6 is an end view of the parts shown in Fig. 5. Fig. 7 is a sectional detail of the stand 16, showing the grooved arbor 13 and pin 23, which engages therewith. Fig. 8 is a detail hereinafter referred to.

Having reference to the drawings, 1 represents a table or bed, which may form a part of a stand of any suitable character.

2 2 are lugs extending upwardly from opposite sides of the said table or bed 1 at one end of the latter.

3 is a shaft extending transversely across the said table or bed 1 and having at its ends journals which are fitted to bearings provided therefor in the said lugs 2 2. These journals are disposed eccentrically with relation to the longitudinal axis of the shaft 3, as is shown in Fig. 1, in which figure the intermediate portion of the shaft is indicated by a dotted circle.

4 is a platen. At one end thereof the said platen is formed with an enlargement which is bored to fit the intermediate portion of the shaft 3. The opposite end of the said platen rests on the upper end of a set-screw 5, which latter passes through a threaded hole in the corresponding end of the table or bed 1 and may be turned in said hole to raise or lower the said end of the platen.

6 is a projection extending upwardly from the table or bed 1 and fitting a slot 7 in the platen 4, the said projection serving to guide and steady the platen as it is adjusted.

8 is a stand applied to the platen 4 at a point near the pivoted end of the latter and carrying at its upper end the tubular guide 9, which receives the blank 10 while being cut. At 11 is the diagonal slot in the said tubular guide in which the cutter works.

The cutter 100, its shaft 101, and the means for supporting and rotating the said shaft are or may be of any ordinary or suitable arrangement and construction.

12 is the chuck in which the blank is held while being cut.

13 is the arbor to the end of which the said chuck is applied. The said arbor is set at an angle to the shaft of the cutter, as shown and as usual. It is journaled in bearings 14 14 on a frame 15, mounted to slide in ways on the platen 4. The said arbor has between the said bearings 14 14 a middle portion of enlarged diameter, in which is cut a groove 151 of predetermined curvature. The groove is formed in accordance with known mathematical principles and is shaped to produce grooves of the desired character in the drills or other articles which are cut by the machine.

16 is a stand occupying a position between the bearings 14 14 and formed and secured in place on the said platen in the manner indicated in Fig. 4, it having at the middle thereof a downwardly-extending projection 161, which passes through slots 17 and 18, that are formed in the base-plate of the sliding frame 15 and in the platen 4, respectively. This extension 161 is formed with a threaded hole 162 to receive the threaded stem of a clamping-screw 19, which latter extends upwardly from below and has applied thereto beneath the platen 4 a plate or washer 20, bridging the slot 18. The slot 17 in the base-plate of the sliding frame enables the said sliding frame to move endwise in the working of the machine. The slot 18 in the platen 4 enables the stand 16 to be adjusted in the direction of the length of the machine. This adjustment is required in adapting the machine to the cutting of drills, and similar articles having a spiral groove or grooves therein, of different sizes.

21 is a hole made through the stand 16 and fitted to constitute a bearing for the sleeve 22. This sleeve is provided at one end with the enlargement 23, fitting against one side of the stand 16. On its other end and fitting against the opposite side of the stand 16 is secured the worm-gear 24. The said collar or enlargement and the worm-gear prevent movement of the sleeve endwise through the bearing therefor in the stand 16.

25 is a screw or pin that is fitted to a hole in the sleeve 22. The inner end of this screw or pin projects into the groove 151.

25 26 are holes or depressions made in the exterior of the sleeve 22 at points diametrically opposite each other. 27 27 are grooves extending circumferentially of the sleeve 22. These grooves are of gradually-diminishing depth and each of them leads a short distance around the sleeve from one side of a hole or depression 26, which latter it intersects.

28 is a bolt fitted to a chamber 281 at one side of the stand 16, the said bolt being shaped at its inner end to fit each of the holes or depressions 26 26 in the sleeve. The said chamber 281 is formed in a lateral extension 29 of the stand 16, and to the said extension is applied a cap 30. The reduced outer end or stem of the bolt 28 passes through a spring 31, which latter is compressed between the cap 30 and the collar or enlargement 32 on the said bolt. By means of this spring the inner end of the bolt is forced to enter whichever of the holes or depressions in the exterior of the sleeve 22 is presented thereto in the working of the machine. The bolt, when entered in either one of the said holes or depressions, locks the said sleeve from rotation. When the sleeve is thus locked from rotation, the inner end of the screw or pin 25 projecting into the groove 151 in the arbor 13 constitutes a fixed abutment, against which the sides of the grooves 151 may act in the rotation of the arbor 13, and accordingly when the sleeve 22 is locked and the arbor 13 is rotated the said arbor and the parts connected with it will be impelled lengthwise of the said arbor, the direction of the resulting movement of the arbor, &c., being determined by the direction in which the arbor rotates, all as will be understood. The ends of the enlarged middle portion of the arbor 13 come in contact with the inner ends of the bearings 14 14, so that when force is applied to the arbor 13 in a manner tending to move said arbor 13 endwise the frame 15 is carried in the same direction.

33 is a worm-gear affixed to the arbor 13. This worm-gear is mounted on the end of the said arbor which is opposite to that end which carries the chuck 12, and is outside the bearing 14 at the end to which it is applied. This worm-gear is engaged, for the purpose of rotating the arbor, by a worm 34 on a sleeve 35.

36 is a bevel-gear at the lower end of the said sleeve, meshing with a bevel-gear 37, mounted on the shaft 38. The bevel-gear 37 is formed with a sleeve 39, having at each end thereof a collar or enlargement 40. A bearing 41, connected with a vertical portion of the sliding frame 15, surrounds the sleeve at one side of the beveled gear 37. The said bearing fits between the bevel-gear 37 and one of the collars or enlargements 40 and serves as a means of sliding the bevel-gear 37 along the shaft 38 in unison with the endwise movements of the sliding frame 15. The shaft 38 has formed therein a longitudinal groove 42, the latter receiving a projection in the eye of the bevel-gear, thus compelling the shaft and bevel-gear to turn in unison, while permitting the bevel-gear to be slid along the shaft. At the other side of the said bevel-gear 37, and between the said bevel-gear and the other collar 40, is loosely fitted the strap or collar 43, having connected therewith the spindle 44, by which the sleeve 35 is supported and on which said sleeve rotates. The upper end of this spindle 44 is steadied by being passed through a hole in an arm 45, that is held by a screw 46 to the said upright portion of the frame 15. Through the connections just described rotary movement is transmitted to the arbor 13 from the shaft 38, while the sliding frame 15 moves endwise.

The shaft 38 (see Fig. 3) is journaled in bearings 47 47, that are attached to the platen 4. On this shaft 38 there are mounted pulleys 48 and 49. These pulleys are loose on the said shaft. Around one of them, 48, passes the open belt 50, and around the other one, 49, passes the crossed belt 51.

52 is a clutch-hub, it being fitted with a projection entering the groove 42 in the shaft 38 and compelling the said clutch-hub to rotate in unison with the shaft. The said clutch-hub is free to be moved lengthwise of the shaft 38 and serves as a means of connecting the pulleys 48 49, alternately, with the shaft 38. According to the one of the said pulleys which is clutched to the shaft 38 depends the direction in which the said shaft and the arbor 13 are rotated.

53 is a depending arm having a projection which enters the groove 54 of the clutch-hub, and 55 is a rock-shaft, with one end of which arm 53 is connected. To the other end of rock-shaft 55 (see Fig. 1) is affixed an upwardly-extending arm 56, provided with a cross-piece 57, on which are mounted fingers 58 58, held adjustably in place on said cross-piece by clamping-screws 59 59.

60 is a pin that projects from one side of the sliding frame 15 and is arranged to strike against said fingers as the said frame slides on the platen 4. By thus striking one of the fingers the said pin turns the rock-shaft through a partial revolution, thereby sliding the clutch-hub on shaft 38, disconnecting the shaft from the pulley which was its driver and connecting it with the other pulley, thereby reversing the direction in which said shaft, and from it the sliding frame, is actuated. The pin 60 plays to and fro between the fingers 58 58, striking one of them as the sliding frame reaches the predetermined limit of its movement in either direction, thereby automatically reversing its movement. The fingers 58 58 may be set and secured on the cross-piece 57 in the positions required for securing strokes of any desired length. For the purpose of holding the clutch-hub in the position into which it has been shifted, as well as for insuring a completion of the shifting movement of the said hub and parts by which it is slid endwise on shaft 38, the rock-shaft 55 or some part connected therewith is formed with a pointed or wedge-shaped cam or projection 61, as indicated in Fig. 8. A lever 62 coacts with this cam or projection, one end thereof being pressed with a yielding force against the latter by means of a spring 63.

64 is an arm which is fixed to one end of the shaft 3, Figs. 1 and 2, and has pivotally joined to it a rod 65, passing through guides 66 66, affixed to the table or bed 1. On this rod are placed collars 67 671, that are secured adjustably in place by the clamping-screws 68 68.

69 is an arm projecting from the sliding frame 15 into position to engage with the collars 67 671 as the said frame reciprocates. After the frame 15 has completed a predetermined portion of the advancing movement by which it feeds the blank to the cutter the arm 69 strikes the collar 67 and pushes the rod along in the direction in which the frame is moving. This turns the shaft 3 gradually on its eccentric journals and gradually depresses the connected end of the platen 4, thereby lowering the blank beneath the cutter in a manner to diminish gradually the depth of the groove that is made by the latter in the blank. As the sliding frame 15 returns in the opposite direction and nears the end of its movement the arm 69 acts against collar 671 in a manner to move the rod 65 and arm 64 reversely, and thereby turn shaft 3, so as to raise the platen 4 into its original position.

70 is a second rod, which is loosely jointed to the arm 64 by means of a pin 71 on the said arm entering the opening of a loop 72, formed by bending the corresponding end of the said rod. This rod has placed thereon a spring 73, which surrounds the rod between the arm 69 and a finger 74, that is secured at the desired point on the rod by a clamping-screw 75.

76 is a catch pivoted to the platen 4 at 77 and having an overweighted hooked end, which engages finger 74 to hold the rod 70 in a retracted position. The said catch holds the rod 70 in such position during the advance of the sliding frame 15 until the arm 69 presses against the head of the adjustable screw 78, projecting rearwardly from the depending tail of the catch. When this occurs, the catch is moved to disengage it from the finger 74, and the spring 73, which has been compressed in the advance of arm 69, is permitted to act to force the rod 70 forward suddenly. This takes place at the moment when the cut has been made sufficiently far along the stem of the blank, and the result is to cause the end of the loop in the rod 70 to act against the pin 71 and communicate a rapid movement to the shaft 3, giving a quick additional depression to the platen 4 sufficient to clear from the cutter the surfaces and edges of the groove just formed in the blank and enabling the reverse movement of the sliding frame and the blank carried thereby to be made without danger of injury to the blank in consequence of contact of the edges of the groove with the cutter during the retraction of the blank.

79 is a collar adjustably held on the rod 70 by a clamping-screw 80. Arm 69 acts against this collar in the return movement of the sliding frame 15 to restore the said rod 70 to its original position. As the rod is drawn into such position the finger 74 passes under the hooked end of catch 76, which rises to permit the finger to pass, after which it drops in front thereof and holds it.

81 is a bevel-gear fitted to the shaft 38 and secured at the desired point in the length of said shaft by a clamping-screw 82, passing through the sleeve of the said beveled gear. This adjustment is made in order to conform to the adjustment of stand 16 upon the platen.

83 is a bevel-gear in mesh with and driven from the bevel-gear 81 and provided on the lower end of the sleeve 84, which latter at its upper end is provided with the worm 85. The said worm is adapted to mesh with the worm-gear 24, which surrounds the arbor 13, but the said worm normally is held out of mesh with the teeth of the said worm-gear, so that it rotates without rotating the worm-gear.

The sleeve 84 turns on the spindle 86, carried by the collar or strap 87, which encircles the reduced portion of the sleeve of the beveled gear 81.

At a certain time in the working of the machine the worm 85 is placed in mesh with the worm-gear 24, and, the locking-bolt 28 having been withdrawn from engagement with the sleeve 22, said worm is allowed to operate to rotate the said sleeve through half a revolution in unison with the revolution of the arbor and in the same direction with the latter. This action takes place after one of the grooves has been cut in the blank, and is caused to occur in order that the proper uncut portion of the blank may be presented to the cutter for the formation of the other groove. It is occasioned automatically by the devices which now will be described.

88 (see Fig. 2) is a bar connecting the upper end of the spindle 86 with the upper end of a lever 89, which latter is pivoted on stand 16 and is loosely connected with the bolt 28, as by means of a slot in said lever and a pin 90, extending from the bolt into said slot.

91 is a roller mounted on the bar 88.

92 is a cam-piece fixed by means of a thumb nut and screw 93, Fig. 2, to a bar 94, which is pivoted at its ends in arms 95 95, connected with the caps of the bearings 14 14. The bar 94 is formed with a longitudinal slot 951 to enable the cam-piece to be adjusted so as to be encountered either sooner or later by the roller 91 in the endwise movement of the sliding frame 15.

96 is a curved arm extending downwardly from the cam-piece and projecting underneath the arbor 13.

97 97 are pins projecting from the gear 24, parallel with the arbor 13.

During an advancing movement of the sliding frame one groove is cut in the blank At the end of such advancing movement the reversing devices are brought into action and the shaft 3 is rocked to depress the platen and clear the blank from the cutter. As the sliding frame nears its most retracted position the cam-piece 92 strikes against the roller 91, pressing the bar 88 laterally, carrying the worm 85 partially into mesh with worm-gear 24 and withdrawing bolt 28 from the hole in which its point previously was engaged. As soon as its point is in line with the bottom of the groove 27, which communicates with the said hole 26, the pressure of the side of groove 151 in the rotating arbor against the screw or pin 25 causes the sleeve 22 and worm-gear 24 to turn in unison with the arbor 13. This arrests the retracting endwise movement of the sliding frame 15, because so long as the said sleeve and worm-gear rotate simultaneously with the arbor there is nothing to react against the walls of the groove 151 and produce such endwise movement. When the said movement of frame 15 ceases, the movement of cam-piece 92 relatively to roller 91 ceases also, so that the movement of bar 88 and the entrance of worm 85 into mesh with worm-gear 24 would be incomplete were it not for the fact that the inclined bottom of the groove 27, into which the point of bolt 28 enters, operates as a cam against said point to complete the outward movement of the said bolt. As said movement is thus completed the worm is drawn into full engagement with the worm-gear. When the worm is thus placed in engagement with the worm-gear, it operates positively to communicate rotation to the latter and sleeve 22, turning them until thrown out of mesh with the said worm-gear again.

The worm is disengaged from the worm-gear at the end of a half-revolution of the latter and the sleeve in the following manner: by the time the sliding frame has been retracted sufficiently to cause cam-piece 92 to act in the manner described, the arm 96, which is attached to the said cam-piece, is carried into range with the pins 97 97, projecting from the gear 24, although neither of the said pins acts against the said arm so long as the worm-gear is held from rotation. As the worm-gear rotates, however, one of the pins 97 acts against the arm 96 and moves said arm and the cam-piece 92 in a manner to raise the latter above the roller 91. At this time, as will be borne in mind, the bolt 28 is pressed out by the inclined bottom of one of the grooves in the exterior of the sleeve in such manner as to relieve the pressure between the roller and cam-piece, and it continues to be held out by the surface of the sleeve, after the lifting of the cam-piece, until the sleeve has made half a revolution and presented the opposite hole to the bolt. When such hole reaches the bolt, the latter flies into the same under the action of its spring, arresting the rotation of the sleeve and causing the worm to be taken out of mesh with the worm-gear. The screw or pin 25 having become fixed again it reacts against the side of the groove 151 in the arbor 13, and hence the latter resumes its endwise movement of retraction, it having, for the short interval occupied in giving the half-revolution to the sleeve 22 and pin 25, been interrupted in such movement. Shortly afterward the reversing devices act to change the direction of rotation of the arbor and the direction of the endwise movement of the sliding frame 15, and the blank is carried forward a second time under the cutter, in order that the second groove may be cut therein.

The action of the machine is continuous and uninterrupted until the motion of the belts 50 and 51 is discontinued, and the operations described are repeated automatically and in the proper order until such discontinuance.

I claim as my invention—

1. A machine for cutting twist-drills, &c., comprising a grooving device, an arbor for supporting a blank and presenting the same to the action of the grooving device said arbor having a feed-spiral, a fixed device engaging said feed-spiral, a sliding frame in which said arbor is mounted to turn, a driving-shaft, means for transmitting rotary motion from said shaft to said arbor as the sliding frame and arbor move endwise, and reversing devices whereby at the end of the stroke of the sliding frame and arbor in each direction the rotary motion given to the driving-shaft and transmitted to the arbor is reversed, substantially as described.

2. A machine for cutting twist-drills, &c., comprising a grooving device, an arbor for supporting the blank and presenting the same to the action of the grooving device, said arbor having a feed-spiral, a sliding frame in which said arbor is mounted to turn, a driving-shaft, a wheel thereon compelled to rotate therewith but free to slide longitudinally thereon, a projection from the said sliding frame causing the said wheel to move in unison with the said frame, means for transmitting rotary motion from the said wheel to the said arbor, loose wheels on said driving-shaft adapted to be rotated in opposite directions, a clutch-hub whereby either of said loose wheels may be clutched to the driving-shaft, and a shifter for said clutch-hub operated by the sliding frame, substantially as described.

3. The combination with the arbor having a feed-spiral, a sleeve carrying a pin engaging said spiral, a locking device for holding said sleeve from rotation, a device for rotating said sleeve, normally out of engagement therewith, and means whereby at the end of the retracting movement of the arbor the locking device is disengaged and the rotating device is engaged to give a partial rotation to the sleeve, substantially as described.

4. The combination with the sliding frame the arbor journaled therein and having a feed-spiral, the sleeve having a projection engaging said feed-spiral and also provided with a worm-gear, the stand supporting said sleeve, the locking device engaging the sleeve, the worm normally disengaged from the worm-gear, the bar 88 whereby the worm and locking device may be shifted, the cam-piece carried by the sliding frame and adapted to actuate the bar 88, and means whereby after the said cam-piece acts to move the bar it is thrown out of engagement with the latter, substantially as described.

5. The combination with the sliding frame, the arbor journaled therein having a feed-spiral, the sleeve having a projection engaging said feed-spiral, the worm-gear attached to said sleeve, the pins 97, 97, rotating with said sleeve and worm-gear, the stand supporting the sleeve, the locking device in the sleeve, the worm normally disengaged from the worm gear, the bar 88 whereby the worm and locking device may be shifted, the pivotally-mounted cam-piece adapted to actuate the bar 88, and the arm 96, substantially as described.

In testimony whereof I affix my signature in presence of two witnesses.

HEBER C. PETERS.

Witnesses:
WM. A. MACLEOD,
CHAS. F. RANDALL.